(12) United States Patent
Lee

(10) Patent No.: US 8,254,911 B1
(45) Date of Patent: Aug. 28, 2012

(54) ESTIMATION OF DIRECT CHANNEL AND INTERFERENCE CHANNEL

(75) Inventor: Jungwon Lee, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 1127 days.

(21) Appl. No.: 12/128,048

(22) Filed: May 28, 2008

Related U.S. Application Data

(60) Provisional application No. 60/941,818, filed on Jun. 4, 2007.

(51) Int. Cl.
*G06F 15/16* (2006.01)

(52) U.S. Cl. ........................................ 455/425; 455/450

(58) Field of Classification Search ............... 455/67.11, 455/425, 450, 452.1
See application file for complete search history.

(56) References Cited

U.S. PATENT DOCUMENTS

2007/0041429 A1 * 2/2007 Khandekar .................. 375/146

* cited by examiner

*Primary Examiner* — Sam Bhattacharya

(57) ABSTRACT

A mobile station (MS) includes an input, and a channel estimation module. The input receives signals from N base stations (BSs), where N is an integer greater than 1. The N BSs include a serving BS of the MS and (N−1) neighboring BSs. Each of the N BSs uses at least N pilot values to transmit the signals. One of the signals having a direct channel gain (direct channel) is transmitted by the serving BS. Others of the signals having (N−1) interference channel gains (interference channels) are transmitted by the (N−1) neighboring BSs. The channel estimation module generates channel estimates of the direct channel and the (N−1) interference channels based on the N pilot values when the MS is associated with the serving BS.

32 Claims, 10 Drawing Sheets

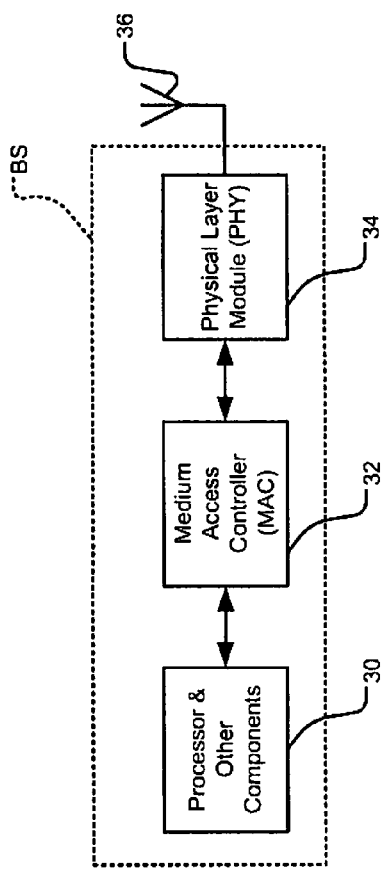
FIG. 1B
_Prior Art_
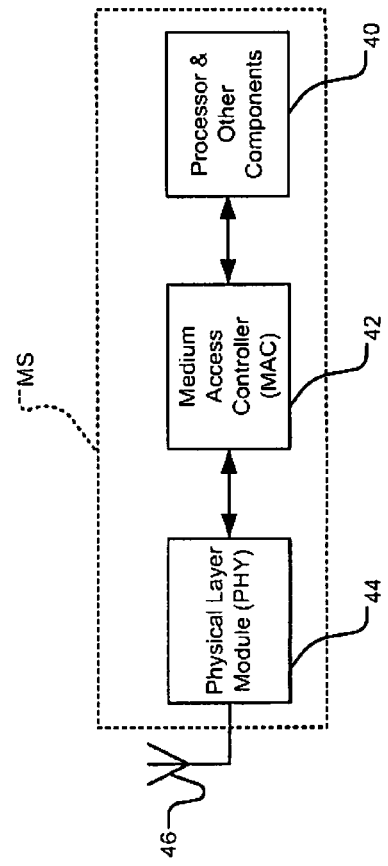
FIG. 1C
_Prior Art_

|     | P1  | P2  | P3  |
| --- | --- | --- | --- |
| BS1 | ±1  | 0   | 0   |
| BS2 | 0   | ±1  | 0   |
| BS3 | 0   | 0   | ±1  |

FIG. 2A

|     | P1  | P2  |
| --- | --- | --- |
| BS1 | 1   | 1   |
| BS2 | 1   | -1  |

FIG. 2B

|      | P1   | P2   | P3   |
| ---- | ---- | ---- | ---- |
| BS1  | -1   | 0    | 0    |
| BS2  | 0    | 1    | 0    |
| BS3  | 0    | 0    | -1   |
|      | Y[1] | Y[2] | Y[3] |

ESTIMATION OF DIRECT CHANNEL AND INTERFERENCE CHANNEL

CROSS-REFERENCE TO RELATED APPLICATIONS

This application claims the benefit of U.S. Provisional Application No. 60/941,818, filed on Jun. 4, 2007. The disclosure of the above application is incorporated herein by reference in its entirety.

FIELD

The present disclosure relates to communication systems, and more particularly to estimating direct and interference channels in cellular communication systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIGS. 1A-1C, cellular communication systems (hereinafter cellular systems) typically comprise multiple base stations and mobile stations. In FIG. 1A, an exemplary cellular system 10 comprising base stations BS1, BS2, and BS3 (collectively BS) and a mobile station (MS) is shown.

In FIG. 1B, each BS may comprise a processor 30, a medium access controller (MAC) 32, a physical layer (PHY) module 34, and an antenna 36. In FIG. 1C, the MS may comprise a processor 40, a MAC 42, a PHY module 44, and an antenna 46. The PHY modules 34 and 44 may comprise radio frequency (RF) transceivers (not shown) that transmit and receive RF signals via the antennas 36 and 46, respectively.

The BSs and the MS may transmit and receive signals while the MS moves relative to the BSs. Consequently, the MS may receive signals transmitted by one or more BSs depending on the location of the MS relative to the BSs. For example, the MS may receive signals transmitted by BS1, BS2, and BS3 when the MS is located as shown in FIG. 1A.

Typically, the BSs use the same channel, frequency, and time slot to transmit signals. The MS may associate with a BS called a serving BS and receive signals transmitted by the serving BS. A channel of signals received by the MS from the serving BS is called a direct channel. Additionally, the MS may receive signals transmitted by one or more neighboring BSs. A channel of signals received by the MS from a neighboring BS is called an interference channel.

When the MS is associated with the serving BS, the signals received by the MS from the neighboring BSs may interfere with the signals received by the MS from the serving BS. The resulting interference is called inter-cell co-channel interference (hereinafter interference). The quality of communication between the MS and the serving BS may degrade more due to the interference than due to noise when cell size decreases.

To reduce the interference, most cellular systems use different frequencies, time slots, or codes to transmit signals from different BSs so that the signals transmitted by multiple BSs are almost orthogonal to each other. Since cross-correlation between signals that are almost orthogonal is nearly zero, the interference between the signals is reduced.

For example, systems utilizing Orthogonal Frequency Division Multiplexing Access (OFDMA) use pilot tones that are almost orthogonal, and systems utilizing Code Division Multiple Access (CDMA) use codes that are almost orthogonal. In the OFDMA systems, the pilot tones are generated using pseudo-random noise (PN) sequences. The PN sequences, however, may have some non-zero cross-correlation. Consequently, the pilot tones may not be perfectly orthogonal, and some interference may persist. Similarly, some interference may persist in CDMA systems when the codes are not perfectly orthogonal.

SUMMARY

A mobile station (MS) comprises an input and a channel estimation module. The input receives signals from N base stations (BSs), where N is an integer greater than 1. The N BSs include a serving BS of the MS and (N−1) neighboring BSs. Each of the N BSs uses at least N pilot values to transmit the signals. One of the signals having a direct channel gain (direct channel) is transmitted by the serving BS. Others of the signals having (N−1) interference channel gains (interference channels) are transmitted by the (N−1) neighboring BSs. The channel estimation module generates channel estimates of the direct channel and the (N−1) interference channels based on the N pilot values when the MS is associated with the serving BS.

In other features, the N pilot values are generated based on sequences having a non-zero cross-correlation. The N pilot values are decoded from one of a preamble sequence and a DL-MAP transmitted by the N BSs.

In another feature, the channel estimation module generates a first matrix based on the signals, a second matrix based on the N pilot values, and a third matrix that is a complex conjugate of the second matrix.

In other features, the channel estimation module generates a fourth matrix that is a pseudo-inverse of the second matrix and a fifth matrix that is a product of the first and fourth matrices. The fifth matrix includes the channel estimates.

In other features, the channel estimation module generates a fourth matrix that is a product of a noise variance and an identity matrix that is of the same order as the second matrix, a fifth matrix that is a product of the second and third matrices, a sixth matrix that is a sum of the fourth and fifth matrices, a seventh matrix that is a product of the first and third matrices, and an eighth matrix by dividing the seventh matrix by the sixth matrix. The eighth matrix includes the channel estimates.

In other features, the MS further comprises an interference suppression module that suppresses inter-cell co-channel interference (interference) based on the channel estimates. The interference is generated when the other signals interfere with the signal.

In another feature, the MS further comprises antennas that are arranged in a multiple-input multiple-output (MIMO) configuration and that receive the signals via at least one of the antennas.

In another feature, the MS and the N BSs communicate via a cellular communication system that includes one of an Orthogonal Frequency Division Multiplexing Access (OFDMA) system, a Code Division Multiple Access (CDMA) system, and a Worldwide Interoperability for Microwave Access (WiMAX) system.

In still other features, a method comprises associating a mobile station (MS) with one of N base stations (BSs), where N is an integer greater than 1. Each of the N BSs uses at least N pilot values when communicating with MSs. The method further comprises receiving a signal having a direct channel gain (direct channel) from one of the N base stations (BSs) via an input of the MS. The method further comprises receiving signals having interference channel gains (interference channels) from others of the N BSs via the input. The method further comprises generating channel estimates of the direct channel and the interference channels based on the N pilot values when the MS is associated with one of the N BSs.

In another feature, the method further comprises generating the N pilot values based on sequences having a non-zero cross-correlation.

In another feature, the method further comprises decoding the N pilot values from one of a preamble sequence and a DL-MAP transmitted by the N BSs.

In another feature, the method further comprises generating a first matrix based on the signal received from one of the N BSs and the signals received from the others of the N BSs, a second matrix based on the N pilot values, and a third matrix that is a complex conjugate of the second matrix.

In other features, the method further comprises generating a fourth matrix that is a pseudo-inverse of the second matrix and a fifth matrix that is a product of the first and fourth matrices. The fifth matrix includes the channel estimates.

In other features, the method further comprises generating a fourth matrix that is a product of a noise variance and an identity matrix that is of the same order as the second matrix, a fifth matrix that is a product of the second and third matrices, a sixth matrix that is a sum of the fourth and fifth matrices, a seventh matrix that is a product of the first and third matrices, and an eighth matrix by dividing the seventh matrix by the sixth matrix. The eighth matrix includes the channel estimates.

In other features, the method further comprises suppressing inter-cell co-channel interference (interference) based on the channel estimates. The interference is generated when the signals received from the others of the N BSs interfere with the signal received from one of the N BSs.

In another feature, the method further comprises providing antennas that are arranged in a multiple-input multiple-output (MIMO) configuration and receiving the signal from one of the N BSs and the signals from the others of the N BSs via at least one of the antennas.

In other features, the method further comprises communicating with the MS and the N BSs via a cellular communication system. The cellular communication system includes one of an Orthogonal Frequency Division Multiplexing Access (OFDMA) system, a Code Division Multiple Access (CDMA) system, and a Worldwide Interoperability for Microwave Access (WiMAX) system.

In still other features, a mobile station (MS) comprises input means for receiving signals from N base stations (BSs), where N is an integer greater than 1. The N BSs include a serving BS of the MS and (N−1) neighboring BSs. Each of the N BSs uses at least N pilot values to transmit the signals. One of the signals having a direct channel gain (direct channel) is transmitted by the serving BS. Others of the signals having (N−1) interference channel gains (interference channels) are transmitted by the (N−1) neighboring BSs. The MS further comprises channel estimation means for generating channel estimates of the direct channel and the (N−1) interference channels based on the N pilot values when the MS is associated with the serving BS.

In other features, the N pilot values are generated based on sequences having a non-zero cross-correlation. The N pilot values are decoded from one of a preamble sequence and a DL-MAP transmitted by the N BSs.

In another feature, the channel estimation means generates a first matrix based on the signals, a second matrix based on the N pilot values, and a third matrix that is a complex conjugate of the second matrix.

In other features, the channel estimation means generates a fourth matrix that is a pseudo-inverse of the second matrix and a fifth matrix that is a product of the first and fourth matrices. The fifth matrix includes the channel estimates.

In other features, the channel estimation means generates a fourth matrix that is a product of a noise variance and an identity matrix that is of the same order as the second matrix, a fifth matrix that is a product of the second and third matrices, a sixth matrix that is a sum of the fourth and fifth matrices, a seventh matrix that is a product of the first and third matrices, and an eighth matrix by dividing the seventh matrix by the sixth matrix. The eighth matrix includes the channel estimates.

In other features, the MS further comprises interference suppression means for suppressing inter-cell co-channel interference (interference) based on the channel estimates. The interference is generated when the other signals interfere with the signal.

In another feature, the MS further comprises antennas that are arranged in a multiple-input multiple-output (MIMO) configuration and that receive the signals via at least one of the antennas.

In another feature, the MS and the N BSs communicate via a cellular communication system that includes one of an Orthogonal Frequency Division Multiplexing Access (OFDMA) system, a Code Division Multiple Access (CDMA) system, and a Worldwide Interoperability for Microwave Access (WiMAX) system.

In still other features, a computer program stored on a computer readable medium and executed by a processor comprises associating a mobile station (MS) with one of N base stations (BSs), where N is an integer greater than 1. Each of the N BSs uses at least N pilot values when communicating with MSs. The computer program further comprises receiving a signal having a direct channel gain (direct channel) from one of the N base stations (BSs) via an input of the MS. The computer program further comprises receiving signals having interference channel gains (interference channels) from others of the N BSs via the input. The computer program further comprises generating channel estimates of the direct channel and the interference channels based on the N pilot values when the MS is associated with one of the N BSs.

In another feature, the computer program further comprises generating the N pilot values based on sequences having a non-zero cross-correlation.

In another feature, the computer program further comprises decoding the N pilot values from one of a preamble sequence and a DL-MAP transmitted by the N BSs.

In another feature, the computer program further comprises generating a first matrix based on the signal received from one of the N BSs and the signals received from the others of the N BSs, a second matrix based on the N pilot values, and a third matrix that is a complex conjugate of the second matrix.

In other features, the computer program further comprises generating a fourth matrix that is a pseudo-inverse of the second matrix and a fifth matrix that is a product of the first and fourth matrices. The fifth matrix includes the channel estimates.

In other features, the computer program further comprises generating a fourth matrix that is a product of a noise variance and an identity matrix that is of the same order as the second matrix, a fifth matrix that is a product of the second and third matrices, a sixth matrix that is a sum of the fourth and fifth matrices, a seventh matrix that is a product of the first and third matrices, and an eighth matrix by dividing the seventh matrix by the sixth matrix. The eighth matrix includes the channel estimates.

In other features, the computer program further comprises suppressing inter-cell co-channel interference (interference) based on the channel estimates. The interference is generated when the signals received from the others of the N BSs interfere with the signal received from one of the N BSs.

In another feature, the computer program further comprises communicating with antennas that are arranged in a multiple-input multiple-output (MIMO) configuration and receiving the signal from one of the N BSs and the signals from the others of the N BSs via at least one of the antennas.

In other features, the computer program further comprises communicating with the MS and the N BSs via a cellular communication system. The cellular communication system includes one of an Orthogonal Frequency Division Multiplexing Access (OFDMA) system, a Code Division Multiple Access (CDMA) system, and a Worldwide Interoperability for Microwave Access (WiMAX) system.

In still other features, a base station (BS) comprises an input and a channel estimation module. The input that receives signals from mobile stations (MSs). One of the signals having a direct channel gain (direct channel) is transmitted by one of the MSs associated with the BS. Others of the signals having interference channel gains (interference channels) are transmitted by others of the MSs associated with neighboring (N−1) BSs, where N is an integer greater than 1. The BS and the (N−1) BSs provide N BSs. Each of the N BSs uses at least N pilot values to communicate with the MS and the MSs. The channel estimation module generates channel estimates of the direct channel and the interference channels based on the N pilot values when one of the MSs is associated with the BS.

In another feature, the N pilot values are generated by the N BSs based on sequences having a non-zero cross-correlation.

In another feature, the channel estimation module generates a first matrix based on the signals, a second matrix based on the N pilot values, and a third matrix that is a complex conjugate of the second matrix.

In other features, the channel estimation module generates a fourth matrix that is a pseudo-inverse of the second matrix and a fifth matrix that is a product of the first and fourth matrices. The fifth matrix includes the channel estimates.

In other features, the channel estimation module generates a fourth matrix that is a product of a noise variance and an identity matrix that is of the same order as the second matrix, a fifth matrix that is a product of the second and third matrices, a sixth matrix that is a sum of the fourth and fifth matrices, a seventh matrix that is a product of the first and third matrices, and an eighth matrix by dividing the seventh matrix by the sixth matrix. The eighth matrix includes the channel estimates.

In other features, the BS further comprises an interference suppression module that suppresses inter-cell co-channel interference (interference) based on the channel estimates. The interference is generated when the other signals interfere with the signal.

In another feature, the BS further comprises antennas that are arranged in a multiple-input multiple-output (MIMO) configuration and that receive the signals via at least one of the antennas.

In another feature, the MSs and the N BSs communicate via a cellular communication system that includes one of an Orthogonal Frequency Division Multiplexing Access (OFDMA) system, a Code Division Multiple Access (CDMA) system, and a Worldwide Interoperability for Microwave Access (WiMAX) system.

In still other features, a method comprises receiving a signal having a direct channel gain (direct channel) from a mobile station (MS) via an input of a base station (BS). The MS is associated with the BS. The method further comprises receiving signals having interference channel gains (interference channels) from MSs other than the MS via the input. The MSs are associated with (N−1) BSs other than the BS, where N is an integer greater than 1. The BS and the (N−1) BSs provide N BSs. Each of the N BSs uses at least N pilot values to communicate with the MS and the MSs. The method further comprises generating channel estimates of the direct channel and the interference channels based on the N pilot values when the MS is associated with the BS.

In another feature, the method further comprises generating the N pilot values based on sequences having a non-zero cross-correlation.

In another feature, the method further comprises generating a first matrix based on the signal received from the MS and based on the signals received from the MSs, a second matrix based on the N pilot values, and a third matrix that is a complex conjugate of the second matrix.

In other features, the method further comprises generating a fourth matrix that is a pseudo-inverse of the second matrix and a fifth matrix that is a product of the first and fourth matrices. The fifth matrix includes the channel estimates.

In other features, the method further comprises generating a fourth matrix that is a product of a noise variance and an identity matrix that is of the same order as the second matrix, a fifth matrix that is a product of the second and third matrices, a sixth matrix that is a sum of the fourth and fifth matrices, a seventh matrix that is a product of the first and third matrices, and an eighth matrix by dividing the seventh matrix by the sixth matrix. The eighth matrix includes the channel estimates.

In other features, the method further comprises suppressing inter-cell co-channel interference (interference) based on the channel estimates. The interference is generated when the signals received from the MSs interfere with the signal received from the MS.

In another feature, the method further comprises providing antennas that are arranged in a multiple-input multiple-output (MIMO) configuration and receiving the signal from the MS and the signals from the MSs via at least one of the antennas.

In other features, the method further comprises communicating with the MS, the MSs, and the N BSs via a cellular communication system. The cellular communication system includes one of an Orthogonal Frequency Division Multiplexing Access (OFDMA) system, a Code Division Multiple Access (CDMA) system, and a Worldwide Interoperability for Microwave Access (WiMAX) system.

In still other features, a base station (BS) comprises input means for receiving signals from mobile stations (MSs). One of the signals having a direct channel gain (direct channel) is transmitted by one of the MSs associated with the BS. Others of the signals having interference channel gains (interference channels) are transmitted by others of the MSs associated with neighboring (N−1) BSs, where N is an integer greater than 1. The BS and the (N−1) BSs provide N BSs. Each of the N BSs uses at least N pilot values to communicate with the MS and the MSs. The BS further comprises channel estimation means for generating channel estimates of the direct channel and the interference channels based on the N pilot values when one of the MSs is associated with the BS.

In another feature, the N pilot values are generated by the N BSs based on sequences having a non-zero cross-correlation.

In another feature, the channel estimation means generates a first matrix based on the signals, a second matrix based on the N pilot values, and a third matrix that is a complex conjugate of the second matrix.

In other features, the channel estimation means generates a fourth matrix that is a pseudo-inverse of the second matrix and a fifth matrix that is a product of the first and fourth matrices. The fifth matrix includes the channel estimates.

In other features, the channel estimation means generates a fourth matrix that is a product of a noise variance and an identity matrix that is of the same order as the second matrix, a fifth matrix that is a product of the second and third matrices, a sixth matrix that is a sum of the fourth and fifth matrices, a seventh matrix that is a product of the first and third matrices, and an eighth matrix by dividing the seventh matrix by the sixth matrix. The eighth matrix includes the channel estimates.

In other features, the BS further comprises interference suppression means for suppressing inter-cell co-channel interference (interference) based on the channel estimates. The interference is generated when the other signals interfere with the signal.

In another feature, the BS further comprises antennas that are arranged in a multiple-input multiple-output (MIMO) configuration and that receive the signals via at least one of the antennas.

In another feature, the MSs and the N BSs communicate via a cellular communication system that includes one of an Orthogonal Frequency Division Multiplexing Access (OFDMA) system, a Code Division Multiple Access (CDMA) system, and a Worldwide Interoperability for Microwave Access (WiMAX) system.

In still other features, a computer program stored on a computer readable medium and executed by a processor comprises receiving a signal having a direct channel gain (direct channel) from a mobile station (MS) via an input of a base station (BS). The MS is associated with the BS. The computer program further comprises receiving signals having interference channel gains (interference channels) from MSs other than the MS via the input. The MSs are associated with (N−1) BSs other than the BS, where N is an integer greater than 1. The BS and the (N−1) BSs provide N BSs. Each of the N BSs uses at least N pilot values to communicate with the MS and the MSs. The computer program further comprises generating channel estimates of the direct channel and the interference channels based on the N pilot values when the MS is associated with the BS.

In another feature, the computer program further comprises generating the N pilot values based on sequences having a non-zero cross-correlation.

In another feature, the computer program further comprises generating a first matrix based on the signal received from the MS and based on the signals received from the MSs, a second matrix based on the N pilot values, and a third matrix that is a complex conjugate of the second matrix.

In other features, the computer program further comprises generating a fourth matrix that is a pseudo-inverse of the second matrix and a fifth matrix that is a product of the first and fourth matrices. The fifth matrix includes the channel estimates.

In other features, the computer program further comprises generating a fourth matrix that is a product of a noise variance and an identity matrix that is of the same order as the second matrix, a fifth matrix that is a product of the second and third matrices, a sixth matrix that is a sum of the fourth and fifth matrices, a seventh matrix that is a product of the first and third matrices, and an eighth matrix by dividing the seventh matrix by the sixth matrix. The eighth matrix includes the channel estimates.

In other features, the computer program further comprises suppressing inter-cell co-channel interference (interference) based on the channel estimates. The interference is generated when the signals received from the MSs interfere with the signal received from the MS.

In another feature, the computer program further comprises communicating with antennas that are arranged in a multiple-input multiple-output (MIMO) configuration and receiving the signal from the MS and the signals from the MSs via at least one of the antennas.

In other features, the computer program further comprises communicating with the MS, the MSs, and the N BSs via a cellular communication system. The cellular communication system includes one of an Orthogonal Frequency Division Multiplexing Access (OFDMA) system, a Code Division Multiple Access (CDMA) system, and a Worldwide Interoperability for Microwave Access (WiMAX) system.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1B is a functional block diagram of an exemplary base station utilized in the system of FIG. 1A;

FIG. 1C is a functional block diagram of an exemplary mobile station utilized in the system of FIG. 1A;

FIGS. 2A and 2B show examples of pilot values that may be used by base stations;

FIG. 3 shows an example of estimating a direct channel;

DETAILED DESCRIPTION

Figure 1A:
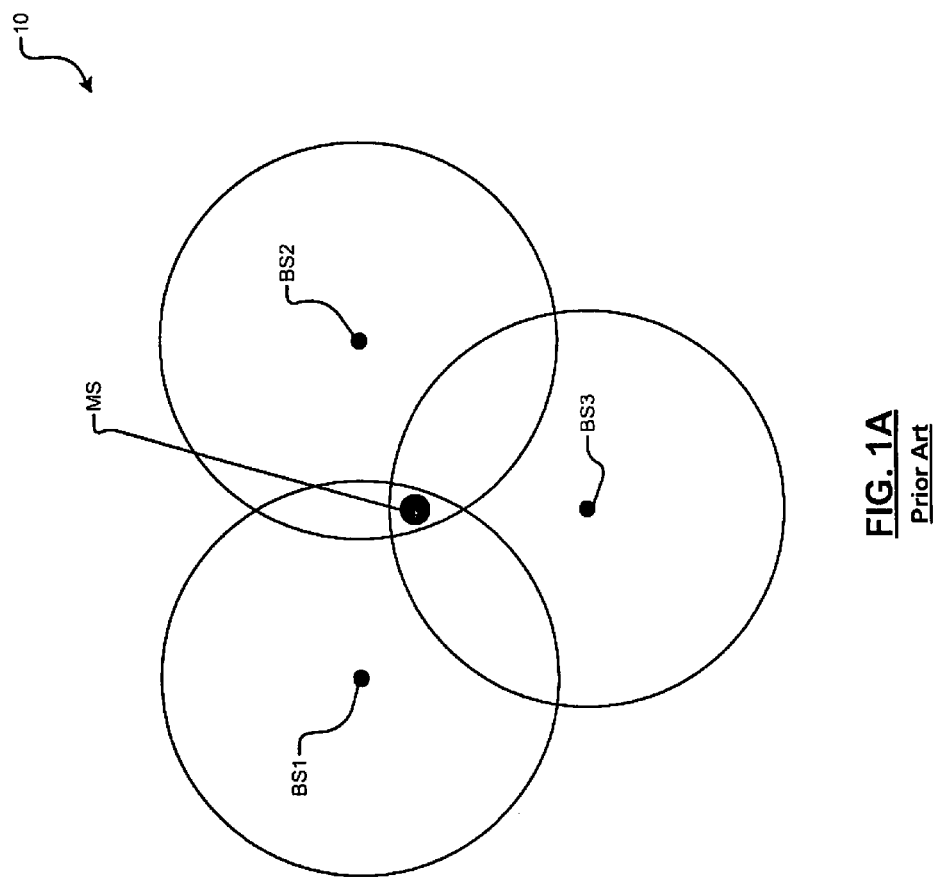
FIG. 1A is a schematic representation of an exemplary cellular communication system comprising three base stations and a mobile station according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In cellular systems comprising base stations (BSs) that use pilot values generated using pseudo-random noise (PN) sequences having low-cross-correlation, mobile stations (MSs) can suppress inter-cell co-channel interference by estimating channels of signals received from all BSs. Specifically, when the MS is associated with the serving BS, the interference may be suppressed by estimating the direct channel (i.e., the channel gain of signals received from the serving BS) and all the interference channels (i.e., the channels or channel gains of signals received from all the neighboring BSs).

The MS may effectively suppress the interference when the number of pilot values used by the BSs is greater than or equal to the number of BSs and when the channel over all the pilot values is almost unchanged. The MS may estimate the direct and interference channels based on the pilot values, which are known to the MS.

The detailed description is organized as follows. First, a few examples of pilot values are discussed. Next, a mathematical model for input signals received by the MS is enumerated. Using the mathematical model, direct channel estimation is mathematically described followed by a numerical example. Subsequently, a matrix model for the input signals is proposed. Using the matrix model, two schemes for estimating direct and interference channels are discussed. Finally, exemplary applications of the schemes are discussed. A downlink (i.e., BS to MS communication) of a cellular system is used as an example only. The schemes are applicable to uplinks (i.e., MS to BS communications) as well.

Referring now to FIGS. 2A and 2B, examples of pilot values are shown. In FIG. 2A, the MS may communicate with BS1, BS2, and BS3. BS1, BS2, and BS3 may use pilots P1, P2, and P3, respectively. Although only three pilots are shown, additional pilots may be used. The pilots P1, P2, and P3 are orthogonal since the cross-correlation between any two pilots is zero. Since the number of pilots is at least equal to the number of BSs, the MS may estimate one direct channel and two interference channels based on the pilot values shown.

In FIG. 2B, the MS may communicate with BS1 and BS2. BS1 and BS2 may use pilots P1 and P2, respectively. Although only three pilots are shown, additional pilots may be used. The pilots P1 and P2 are orthogonal since the cross-correlation between them is zero. Since the number of pilots is at least equal to the number of BSs, the MS may estimate one direct channel and one interference channel based on the pilot values shown.

To understand channel estimation, a signal received by the MS may be mathematically represented as follows.

$$y_r[k] = \sum_{i=1}^{I} h_{r,i} p_i[k] + z_r[k]$$

where r is an antenna index, r=1, 2, . . . , $N_R$, and $N_R$ is the total number of receive antennas of the MS; i is a BS index, i=1, 2, . . . , I, and I is the total number of BSs; and k is a pilot index, k=1, 2, . . . , K, and K is the total number of pilots. $y_r[k]$ is a receive signal received by $r^{th}$ receive antenna. $h_{r,i}$ is channel gain of the signal received by $r^{th}$ antenna from $i^{th}$ BS. $h_{r,i}$ is shown to be independent of the pilot index k since the pilots will not be orthogonal if the channel gain changes over K pilots. Theoretically, pilots can be so generated that the channel gain may change only slightly over K pilots. Practically, however, when channel gain changes, system performance may degrade proportionally. $p_i[k]$ is a transmit signal transmitted by $i^{th}$ BS at $k^{th}$ pilot. The normalized total energy of the transmit signal transmitted by each BS over K pilots is given by $$\sum_{k=1}^{K} |p_i[k]|^2 = 1.$$

$z_r[k]$ is independent and identically distributed (iid) complex Gaussian noise with zero mean and variance.

Using the mathematical representation of the receive signal, a channel estimate of the direct channel may be mathematically expressed as follows.

$$\hat{h}_{r,1} = \sum_{k=1}^{K} p_1^*[k] y_r[k]$$

where i=1 indicates that BS1 is the serving BS, and $p_1[k]$ is a complex conjugate of the transmit signal transmitted by BS1 at $k^{th}$ pilot. The channel estimate of the direct channel is a correlation of the received signal $y_r[k]$ received by the MS and the complex conjugate of the transmit signal transmitted by BS1 at $k^{th}$ pilot. The MS may generate the complex conjugate based on the pilot values used by BS1, which are known to the MS.

Figure 3:
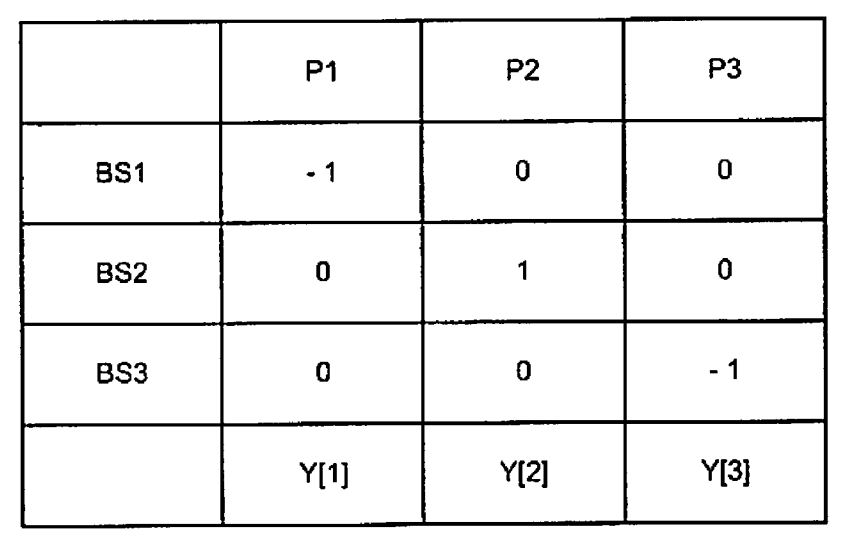

Referring now to FIG. 3, an example of estimating the direct channel follows. For simplicity, let $N_r=1$, and K=3. The MS may receive signals y[1], y[2], and y[3]. When BS1 is the serving BS, y[2]=0 and y[3]=0. The channel estimate of the direct channel for BS1 is:

$$\hat{h}_1(1) = \Sigma p_1[k]y[k] \text{ for } k=1 \text{ to } 3$$

$$\hat{h}_1(1) = (-1)y[1] \text{ since } y[2]=0 \text{ and } y[3]=0$$

where $$y[1] = (-1)h_1(1) + \text{noise}$$

Accordingly, $$\hat{h}_1(1) = h_1(1) - \text{noise}$$

When the pilots are orthogonal, the interference due to signals transmitted by BSs other than the serving BS will be zero during direct channel estimation. When the pilots are not orthogonal, however, the interference will be not be zero and may affect the direct channel estimate. To suppress the interference, the MS may estimate the interference channels in addition to estimating the direct channel.

To understand channel estimation of the direct and interference channels, the signal received by the MS may be expressed in matrix form as follows.

$$Y = PH + Z$$

where $$Y = \begin{bmatrix} y_1[1] & y_2[1] & \cdots & y_{N_R}[1] \\ y_1[2] & y_2[2] & \cdots & y_{N_R}[2] \\ \vdots & \vdots & \ddots & \vdots \\ y_1[K] & y_2[K] & \cdots & y_{N_R}[K] \end{bmatrix}$$

$$P = \begin{bmatrix} p_1[1] & p_2[1] & \cdots & p_t[1] \\ p_1[2] & p_2[2] & \cdots & p_t[2] \\ \vdots & \vdots & \ddots & \vdots \\ p_1[K] & p_2[K] & \cdots & p_t[K] \end{bmatrix}$$

$$H = \begin{bmatrix} h_{1,1} & h_{2,1} & \cdots & h_{N_R,1} \\ h_{1,2} & h_{2,2} & \cdots & h_{N_R,2} \\ \vdots & \vdots & \ddots & \vdots \\ h_{1,t} & h_{2,t} & \cdots & h_{N_R,t} \end{bmatrix}$$

and $$Z = \begin{bmatrix} z_1[1] & z_2[1] & \cdots & z_{N_R}[1] \\ z_1[2] & z_2[2] & \cdots & z_{N_R}[2] \\ \vdots & \vdots & \ddots & \vdots \\ z_1[K] & z_2[K] & \cdots & z_{N_R}[K] \end{bmatrix}$$

The MS generates the matrix Y based on the signals received from all the BSs (i.e., the serving BS and all the neighboring BSs). The MS generates the matrix P based on the known pilot values P used by all the BSs. Based on the matrices Y and P, the MS can generate the channel gain matrix H that includes the channel gains of the direct and interference channels. The MS may estimate the direct and interference channels with or without having information about noise.

Specifically, the MS may use one of two channel estimation schemes to estimate the direct and interference channels: zero forcing (ZF) based channel estimation and minimum mean square error (MMSE) based channel estimation. The ZF-based channel estimation estimates the direct and interference channels without noise information, while the MMSE-based channel estimation estimates the direct and interference channels using noise information. The MS may use the ZF-based channel estimation when noise information is unknown. The MS may use the MMSE-based channel estimation system when noise can be known or estimated.

Figure 4A:
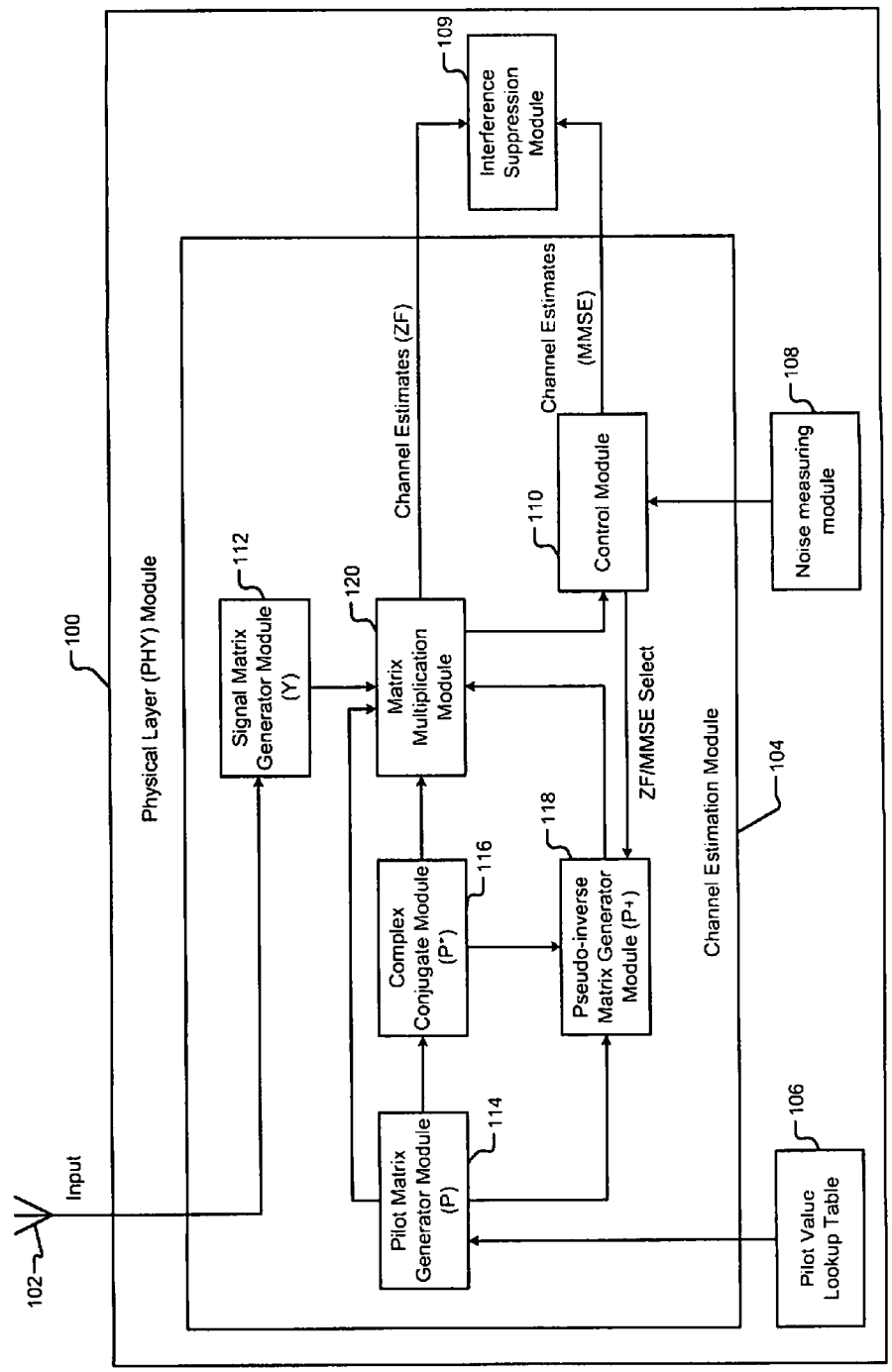
FIGS. 4A and 4B show an exemplary system for estimating direct and interference channels according to the present disclosure.
Figure 4B:
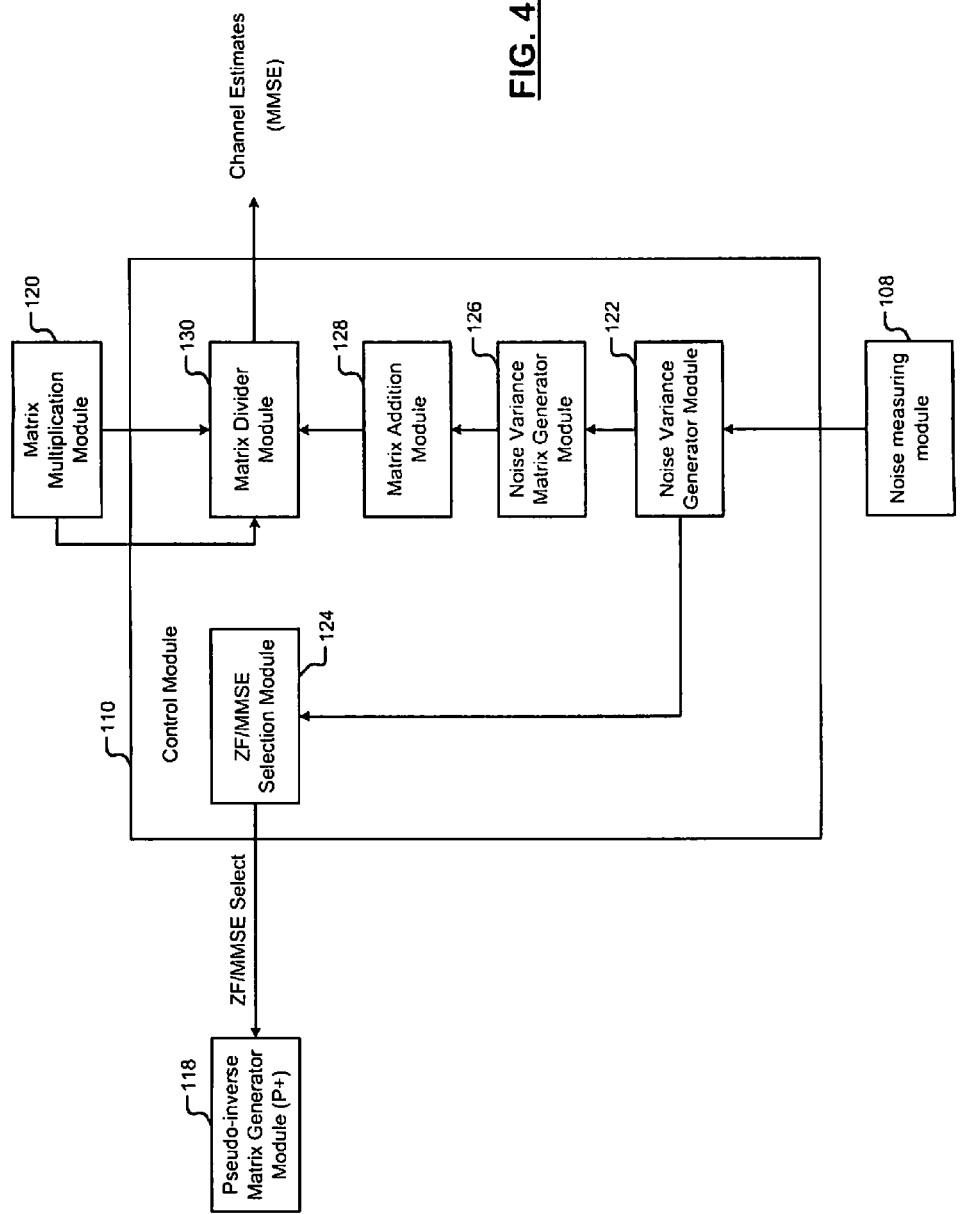

Referring now to FIGS. 4A-4B, a system for the estimating direct and interference channels and suppressing the interference according to the present disclosure is shown. In FIG. 4A, a physical layer (PHY) module 100 of the MS receives input signals transmitted by the BSs (not shown) from an antenna 102. When the MS associates with the serving BS, the input signals may include signals having direct and interference channels that are transmitted by the serving BS and the neighboring BSs, respectively. Although only one antenna is shown, the PHY module 100 may receive signals from multiple antennas. The antennas may be arranged in a multiple-input multiple-output (MIMO) configuration.

The system comprises a channel estimation module 104, a pilot value lookup table 106, a noise measuring module 108, and an interference suppression module 109. When the MS is associated with the serving BS, the channel estimation module 104 estimates the direct and interference channels using ZF-based and/or MMSE-based channel estimation schemes.

The pilot value lookup table 106 stores the pilot values used by the BSs to transmit signals that may be received by the PHY module 100. The noise measuring module 108 measures noise and selectively provides information about noise to the channel estimation module 104. The interference suppression module 109 suppresses the interference based on the direct and interference channel estimates generated by the channel estimation module 104.

The channel estimation module 104 comprises a control module 110, a signal matrix generator module 112, a pilot matrix generator module 114, a complex conjugate module 116, a pseudo-inverse matrix generator module 118, and a matrix multiplication module 120. The control module 110 determines whether to generate the channel estimates using ZF-based and/or MMSE-based channel estimation schemes based on input received from the noise measuring module 108.

The control module 110 selects the MMSE-based channel estimation scheme when noise variance is known. When the MMSE-based channel estimation scheme is selected, the control module 110 may deselect the pseudo-inverse matrix generator module 118 and generate the channel estimates using the MMSE-based channel estimation scheme. The ZF-based and MMSE-based channel estimation schemes are now described in turn.

The channel estimates of the direct and interference channels generated using the ZF-based channel estimation scheme may be mathematically represented by the following equation.

$$\hat{H} = P^+ Y$$

$$P^+ = (P^*P)^{-1} P^*$$

where $P^+$ is a pseudo-inverse matrix of the matrix P, and $P^*$ is the complex conjugate matrix of the matrix P.

The signal matrix generator module 112 communicates with the antenna 102 and generates the matrix Y based on the input signals received by the antenna 102 from the BSs. The pilot matrix generator module 114 generates the matrix P based on the pilot values stored in the pilot value lookup table 106. The complex conjugate module 116 generates the matrix $P^*$. The pseudo-inverse matrix generator module 118 generates the matrix $P^+$. The matrix multiplication module 120 multiplies the matrices $P^+$ and Y to generate the matrix $\hat{H}$ that includes the channel estimates of the direct and interference channels.

When the pilots are generated using orthogonal PN sequences, $P^*P$ is an identity matrix, $P^+ = P^*$, and $\hat{H} = P^*Y$. In other words, the ZF-based channel estimation reduces to estimating only the direct channel, and the channel estimates of the interference channels are not generated.

The channel estimates of the direct and interference channels generated using the MMSE-based channel estimation scheme may be mathematically represented by the following equation.

$$\hat{H} = (P^*P + \sigma_N^2 I)^{-1} P^* Y$$

where $\sigma_N^2$ is noise variance.

In FIG. 4B, the control module 110 comprises a noise variance generator module 122, a ZF/MMSE selection module 124, a noise variance matrix generator module 126, a matrix addition module 128, and a matrix divider module 130. The noise variance generator module 122 generates the noise variance information based on input received from the noise measuring module 108. The noise measuring module 108 measures noise (e.g., white noise) based on inputs received from one or more gain stages (not shown), input signals received by the antenna 102, etc. The noise variance may be known before channel estimation. When the noise variance is known, the ZF/MMSE selection module 124 generates a control signal that deselects the ZF-based channel estimation scheme and selects the MMSE-based channel estimation scheme to estimate the direct and interference channels.

Specifically, when the noise variance is known, the control module 110 deselects the pseudo-inverse matrix generator module 118. The noise variance matrix generator module 126 generates a noise variance matrix ($\sigma_N^2 I$) by multiplying an identity matrix I having the same order as the order of the matrix P by the noise variance $\sigma_N^2$. The matrix addition module 128 adds the matrices (P*P) and ($\sigma_N^2 I$). The matrix divider module 130 divides the matrix (P*Y) by the sum of the matrices (P*P) and ($\sigma_N^2 I$) to generate the matrix H^ that includes the channel estimates of the direct and interference channels.

When the pilots are generated using orthogonal PN sequences, P*P is an identity matrix, and the matrix H^ is given by the following equation.

$$\hat{H} = \frac{1}{1+\sigma_N^2} P^* Y$$

In other words, the matrix H^ is equal to matrix (P*Y) having a scaling factor of $(1/(1+(\sigma_N^2)))$. When $\sigma_N^2 = 0$, the MMSE-based channel estimation reduces to the ZF-based channel estimation. The accuracy of the noise variance information determines whether the channel estimates generated by the ZF-based channel estimation scheme are more or less accurate than the channel estimates generated by the MMSE-based channel estimation scheme.

Figure 5:
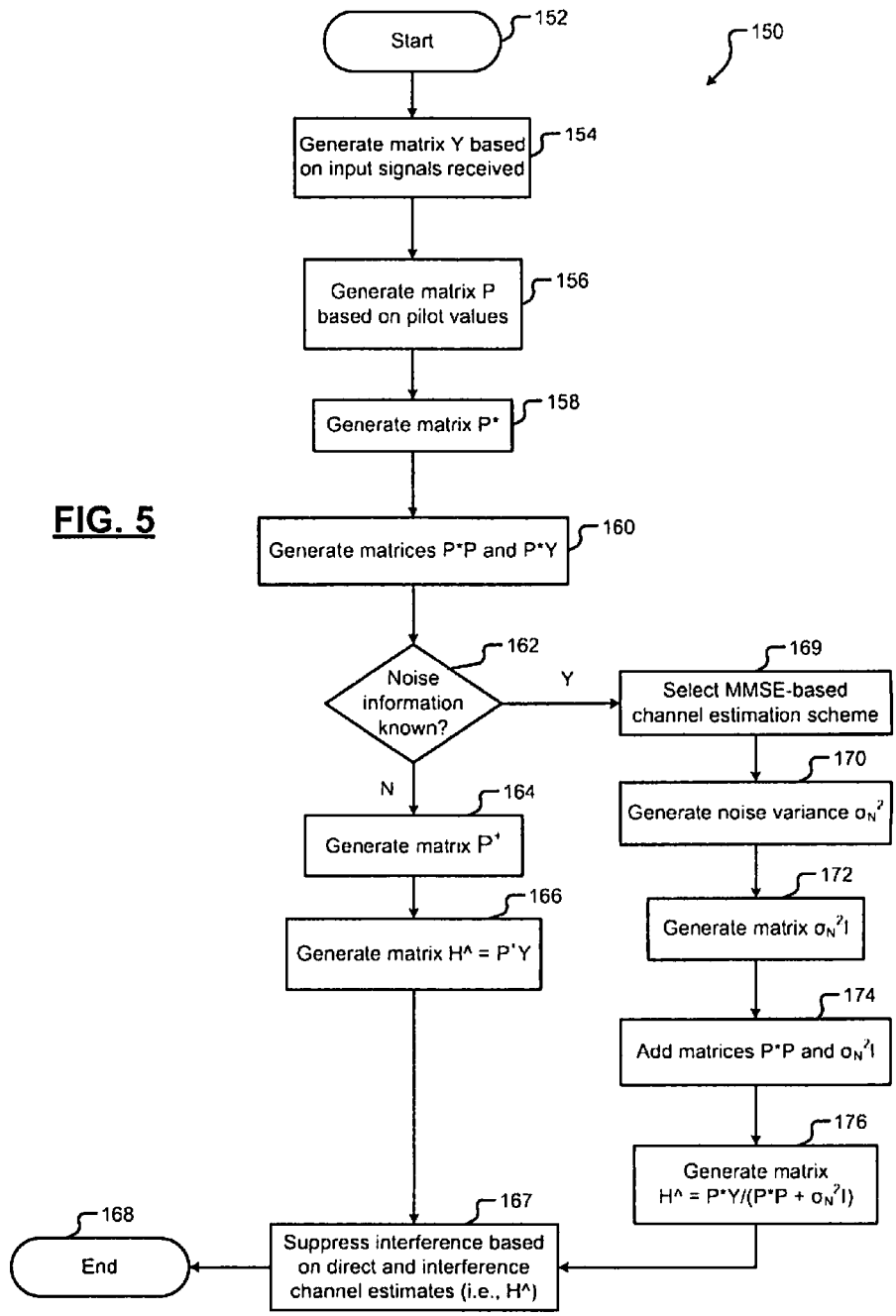
FIG. 5 is a flowchart of an exemplary method for estimating direct and interference channels according to the present disclosure.

Referring now to FIG. 5, a method 150 for generating channel estimates of the direct and interference channels and suppressing the interference according to the present disclosure is shown. The method 150 begins at step 152. When the MS is associated with the serving BS, the signal matrix generator module 112 generates the matrix Y in step 154 based on input signals received by the antenna 102 from the serving and neighboring BSs. The pilot matrix generator module 114 generates the pilot matrix P in step 156 based on the pilot values stored in the pilot value lookup table 106. The complex conjugate module 116 generates the complex conjugate matrix P* in step 158. The matrix multiplication module 120 generates the matrices P*P and P*Y in step 160.

The control module 110 determines in step 162 whether the noise information is known. If the result of step 162 is false, the pseudo-inverse matrix generator module 118 generates the pseudo-inverse matrix P+ in step 164. The matrix multiplication module 120 multiplies the matrices P+ and Y in step 166 to generate the matrix H^ that includes the channel estimates of the direct and interference channels. The interference suppression module 109 suppresses the interference in step 167 based on the channel estimates of the direct and interference channels. The method 150 ends in step 168.

If, however, the result of step 162 is true, the ZF/MMSE selection module 124 generates a control signal that selects the MMSE-based channel estimation scheme by deselecting the pseudo-inverse matrix generator module 118 in step 169. The noise variance generator module 122 generates noise variance $\sigma_N^2$ in step 170 based on the input received from the noise measuring module 108. The noise variance matrix generator module 126 generates the matrix ($\sigma_N^2 I$) in step 172 by multiplying the identity matrix I having the same order as the order of the matrix P by the noise variance $\sigma_N^2$. The matrix addition module 128 adds the matrices (P*P) and ($\sigma_N^2 I$) in step 174. The matrix divider module 130 divides the matrix (P*Y) by the sum of the matrices (P*P) and ($\sigma_N^2 I$) in step 176 to generate the matrix H^ that includes the channel estimates of the direct and interference channels. The interference suppression module 109 suppresses the interference in step 167 based on the channel estimates of the direct and interference channels. The method 150 ends in step 168.

The ZF-based and MMSE-based channel estimation schemes may be used to suppress inter-cell co-channel interference in cellular systems that use pilots and that have following characteristics. The pilots are generated by sequences having low cross-correlation. Different sequences may be used for neighboring BSs. Number of pilot values is at least equal to the number of BSs. Channel is almost unchanged over all the pilot values. Cellular systems having these characteristics include Orthogonal Frequency Division Multiplexing Access (OFDMA) systems, Code Division Multiple Access (CDMA) systems, and Worldwide Interoperability for Microwave Access (WiMAX) systems.

As an example, the ZF-based and MMSE-based channel estimation schemes may be used in WiMAX systems comprising BSs and MSs that are configured to operate in WiMAX wireless networks. WiMAX is a standards-based technology enabling wireless broadband access as an alternative to wired broadband like cable and DSL. WiMAX provides fixed, nomadic, portable, and mobile wireless connectivity without the need for a direct line-of-sight with a base station. WiMAX technology may be incorporated in portable electronic devices such as notebook computers, personal digital assistants (PDAs), etc.

Mobile WiMAX supports a full range of smart antenna technologies including beamforming, spatial multiplexing, etc., to enhance system performance. Mobile WiMAX supports adaptive switching between these options to maximize the benefit of smart antenna technologies under different channel conditions. Smart antenna technologies typically involve complex vector and matrix operations on signals due to multiple antennas. Typically, BSs may have at least two transmit antennas but may transmit preamble symbols via only one transmit antenna. MSs may have at least two receive antennas and may receive signals via more than one receive antenna.

In WiMAX systems, an MS can receive the pilot values from adjacent BSs by decoding preamble sequence and DL-MAP of the respective BSs. DL-MAP is a management message transmitted by the BSs in each frame. DL-MAP includes control information such as PN sequences used by the BSs to generate the pilot values. Adjacent BSs use identical sets of pilot values generated using PN sequences having low cross-correlation. Consequently, the pilot values used by the BSs are almost orthogonal.

The MS can learn the PN sequences used by the BSs by decoding the preamble sequence and the DL map of the serving and neighboring BSs. When the MS is closer to the serving BS than the neighboring BSs, the interference experienced by the MS due to signals transmitted by the neighboring BSs may be negligible. Accordingly, the MS may decode the preamble sequence and the DL-MAP of only the serving BS and not of the neighboring BSs.

Typically, the MS may experience considerable interference due to signals transmitted by at most two or three neighboring BSs depending on the position of the MS relative to the BSs. The number of pilot values used by the BSs is generally 120 per OFDM symbol (i.e., greater than 2 or 3 BSs). When the MS travels at a reasonable speed relative to the BSs, the channel over the pilot values shared by the BSs is almost unchanged. Accordingly, the MS can suppress the interference by estimating one direct channel and two or three interference channels using the ZF-based and/or MMSE-based channel estimation schemes.

The systems and methods for estimating direct and interference channel and suppressing the interference can also be used for uplink communications. For example, a cellular system may comprise three BSs (BS1 to BS3) and three MSs (MS1 to MS3). The three MSs may be associated with the three BSs, respectively. The three BSs may comprise the PHY module 100. For uplink, all the MSs may transmit signals. All the signals may be received by each BS. A BS may, however, receive a signal from one MS that is stronger than the signals received from other MSs. For example, BS1 may receive a signal from MS1 that is stronger than the signals received from MS2 and MS3. Accordingly, BS1 may estimate the direct channel of the signal received from MS1 and the interference channels of the signals received from MS2 and MS3 if three pilots are used. Generally, BS1 can obtain the pilot values used by BS2 and BS3, which serve MS2 and MS3, respectively, by communicating with BS2 and BS3 through a backbone network.

Figure 6A:
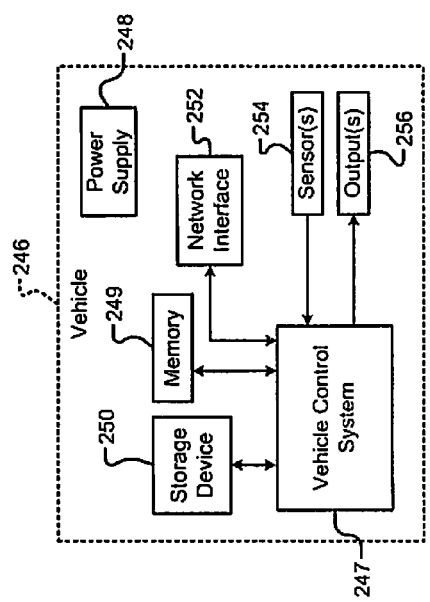
FIG. 6A is a functional block diagram of a vehicle control system.
Figure 6B:
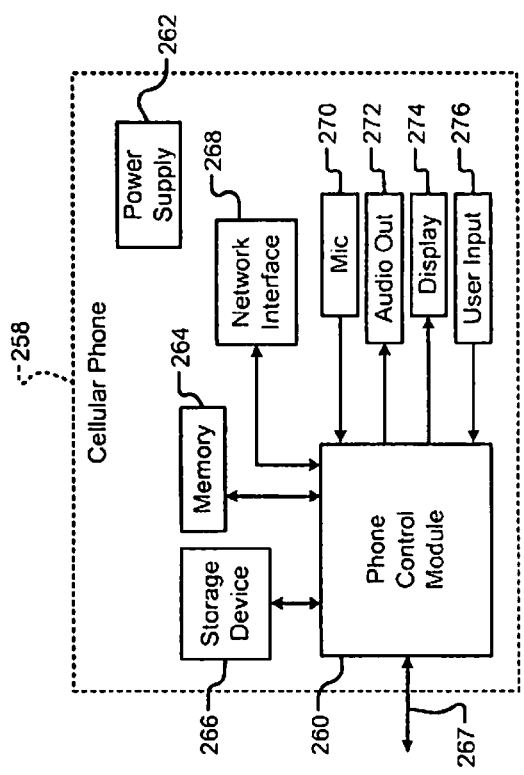
FIG. 6B is a functional block diagram of a cellular phone.
Figure 6C:
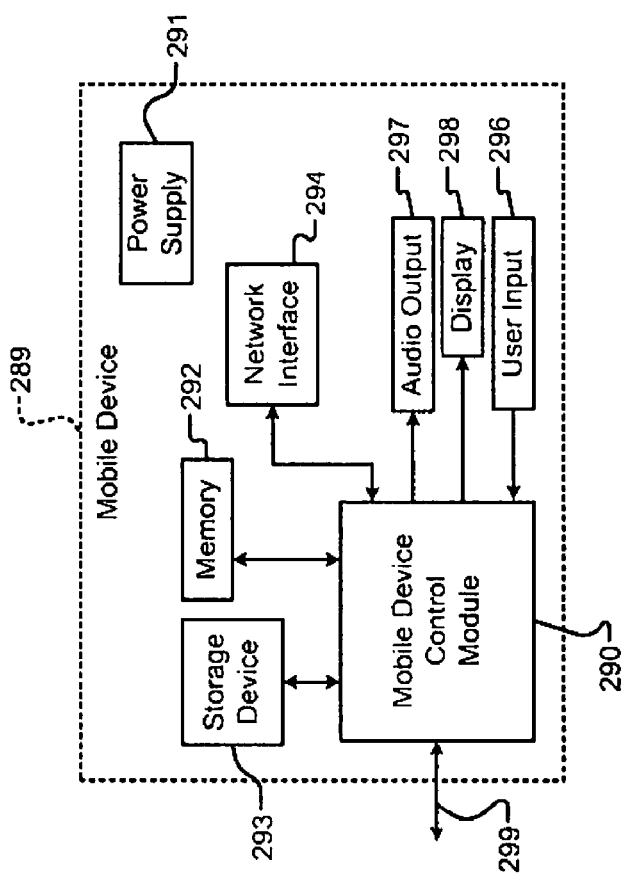
FIG. 6C is a functional block diagram of a mobile device.

Referring now to FIGS. 6A-6C, various exemplary implementations incorporating the teachings of the present disclosure are shown. In FIG. 6A, the teachings of the disclosure may be implemented in a network interface 252 of a vehicle 246. The vehicle 246 may include a vehicle control system 247, a power supply 248, memory 249, a storage device 250, and the network interface 252. The network interface 252 may include an interface for communicating with cellular systems such as OFDMA, CDMA, or WiMAX systems. The network interface 252 may include multiple antennas (not shown).

The vehicle control system 247 may be a powertrain control system, a body control system, an entertainment control system, an anti-lock braking system (ABS), a navigation system, a telematics system, a lane departure system, an adaptive cruise control system, etc. The vehicle control system 247 may communicate externally with different network systems using the network interface 252.

The vehicle control system 247 may communicate with one or more sensors 254 and generate one or more output signals 256. The sensors 254 may include temperature sensors, acceleration sensors, pressure sensors, rotational sensors, airflow sensors, etc. The output signals 256 may control engine operating parameters, transmission operating parameters, suspension parameters, etc.

The vehicle control system 247 may store data in memory 249 and/or the storage device 250. Memory 249 may include random access memory (RAM) and/or nonvolatile memory such as flash memory, phase change memory, or multi-state memory, in which each memory cell has more than two states. The storage device 250 may include an optical storage drive, such as a DVD drive, and/or a hard disk drive (HDD). The power supply 248 provides power to the components of the vehicle 246.

In FIG. 6B, the teachings of the disclosure can be implemented in a cellular network interface 267 of a cellular phone 258. The cellular phone 258 may include a phone control module 260, a power supply 262, memory 264, a storage device 266, the cellular network interface 267, a network interface 268, and a plurality of associated antennas (not shown). The cellular network interface 267 may include an interface for communicating with cellular systems such as OFDMA, CDMA, or WiMAX systems. The cellular phone 258 may include a microphone 270, an audio output 272 such as a speaker and/or output jack, a display 274, and a user input device 276 such as a keypad and/or pointing device.

The phone control module 260 may receive input signals from the cellular network interface 267, the network interface 268, the microphone 270, and/or the user input device 276. The phone control module 260 may process signals, including encoding, decoding, filtering, and/or formatting, and generate output signals. The output signals may be communicated to one or more of memory 264, the storage device 266, the cellular network interface 267, the network interface 268, and the audio output 272.

Memory 264 may include random access memory (RAM) and/or nonvolatile memory such as flash memory, phase change memory, or multi-state memory, in which each memory cell has more than two states. The storage device 266 may include an optical storage drive, such as a DVD drive, and/or a hard disk drive (HDD). The power supply 262 provides power to the components of the cellular phone 258.

In FIG. 6C, the teachings of the disclosure can be implemented in a network interface 294 of a mobile device 289. The mobile device 289 may include a mobile device control module 290, a power supply 291, memory 292, a storage device 293, the network interface 294, an external interface 299, and a plurality of associate antennas (not shown). The network interface 294 may include an interface for communicating with cellular systems such as OFDMA, CDMA, and WiMAX systems. The external interface 299 may include USB, infrared, and/or Ethernet.

The mobile device control module 290 may receive input signals from the network interface 294 and/or the external interface 299. The input signals may include compressed audio and/or video, and may be compliant with the MP3 format. Additionally, the mobile device control module 290 may receive input from a user input 296 such as a keypad, touchpad, or individual buttons. The mobile device control module 290 may process input signals, including encoding, decoding, filtering, and/or formatting, and generate output signals.

The mobile device control module 290 may output audio signals to an audio output 297 and video signals to a display 298. The audio output 297 may include a speaker and/or an output jack. The display 298 may present a graphical user interface, which may include menus, icons, etc. The power supply 291 provides power to the components of the mobile device 289. Memory 292 may include random access memory (RAM) and/or nonvolatile memory such as flash memory, phase change memory, or multi-state memory, in which each memory cell has more than two states. The storage device 293 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:
1. A mobile station (MS) comprising:
an input configured to
receive signals from N base stations (BSs), wherein the N BSs include a serving BS of the MS and (N−1) neighboring BSs,
wherein each of the N BSs uses at least N pilot values to transmit the signals, and
wherein one of the signals having a direct channel gain (direct channel) is transmitted by the serving BS, and wherein others of the signals having (N−1) interference channel gains (interference channels) are transmitted by the (N−1) neighboring BSs, respectively, where N is an integer greater than 1; and a channel estimation module configured to generate channel estimates of the direct channel and the (N−1) interference channels based on the N pilot values when the MS is associated with the serving BS.

2. The MS of claim 1, wherein the N pilot values are generated based on sequences having a non-zero cross-correlation.

3. The MS of claim 1, wherein the N pilot values are decoded from one of a preamble sequence and a downlink map (DL-MAP) transmitted by the N BSs.

4. The MS of claim 1, wherein the channel estimation module is configured to generate (i) a first matrix based on the signals, (ii) a second matrix based on the N pilot values, and (iii) a third matrix, wherein the third matrix is a complex conjugate of the second matrix.

5. The MS of claim 4, wherein the channel estimation module is configured to generate:

a fourth matrix, wherein the fourth matrix is a pseudo-inverse of the second matrix; and a fifth matrix, wherein the fifth matrix is a product of (i) the first matrix and (ii) the fourth matrix, wherein the fifth matrix includes the channel estimates.

6. The MS of claim 4, wherein the channel estimation module is configured to generate:

a fourth matrix, wherein the fourth matrix is a product of (i) a noise variance and (ii) an identity matrix, wherein the identity matrix is of the same order as the second matrix;

a fifth matrix, wherein the fifth matrix is a product of (i) the second matrix and (ii) the third matrix;

a sixth matrix, wherein the sixth matrix is a sum of (i) the fourth matrix and (ii) the fifth matrix;

a seventh matrix, wherein the seventh matrix is a product of (i) the first matrix and (ii) the third matrix; and an eighth matrix by dividing the seventh matrix by the sixth matrix, wherein the eighth matrix includes the channel estimates.

7. The MS of claim 1, further comprising:

an interference suppression module configured to suppress inter-cell co-channel interference (interference) based on the channel estimates, wherein the interference is generated when the others of the signals interfere with the one of the signals.

8. The MS of claim 1, further comprising:

antennas configured to receive the signals via at least one of the antennas, wherein the antennas are arranged in a multiple-input multiple-output (MIMO) configuration.

9. The MS of claim 1, wherein:

the MS and the N BSs are configured to communicate via a cellular communication system, and the cellular communication system includes an Orthogonal Frequency Division Multiplexing Access (OFDMA) system, a Code Division Multiple Access (CDMA) system, or a Worldwide Interoperability for Microwave Access (WiMAX) system.

10. A method comprising:

associating a mobile station (MS) with one of N base stations (BSs), wherein each of the N BSs uses at least N pilot values when communicating with MSs, where N is an integer greater than 1;

receiving a signal having a direct channel gain (direct channel) from the one of the N base stations (BSs) via an input of the MS;

receiving signals having interference channel gains (interference channels) from others of the N BSs via the input; and generating channel estimates of the direct channel and the interference channels based on the N pilot values when the MS is associated with the one of the N BSs.

11. The method of claim 10, further comprising generating the N pilot values based on sequences having a non-zero cross-correlation.

12. The method of claim 10, further comprising decoding the N pilot values from one of a preamble sequence and a downlink map (DL-MAP) transmitted by the N BSs.

13. The method of claim 10, further comprising generating:

a first matrix based on the signal received from the one of the N BSs and the signals received from the others of the N BSs;

a second matrix based on the N pilot values; and a third matrix, wherein the third matrix is a complex conjugate of the second matrix.

14. The method of claim 13, further comprising generating:

a fourth matrix, wherein the fourth matrix is a pseudo-inverse of the second matrix; and a fifth matrix, wherein the fifth matrix is a product of (i) the first matrix and (ii) the fourth matrix, wherein the fifth matrix includes the channel estimates.

15. The method of claim 13, further comprising generating:

a fourth matrix, wherein the fourth matrix that is a product of (i) a noise variance and (ii) an identity matrix, wherein the identity matrix is of the same order as the second matrix;

a fifth matrix, wherein the fifth matrix is a product of (i) the second matrix and (ii) the third matrix;

a sixth matrix, wherein the sixth matrix is a sum of (i) the fourth matrix and (ii) the fifth matrix;

a seventh matrix, wherein the seventh matrix is a product of (i) the first matrix and (ii) the third matrix; and an eighth matrix by dividing the seventh matrix by the sixth matrix, wherein the eighth matrix includes the channel estimates.

16. The method of claim 10, further comprising:

suppressing inter-cell co-channel interference (interference) based on the channel estimates, wherein the interference is generated when the signals received from the others of the N BSs interfere with the signal received from the one of the N BSs.

17. The method of claim 10, further comprising:

providing antennas that are arranged in a multiple-input multiple-output (MIMO) configuration; and receiving the signal from the one of the N BSs and the signals from the others of the N BSs via at least one of the antennas.

18. The method of claim 10, further comprising:

communicating with the MS and the N BSs via a cellular communication system, wherein the cellular communication system includes an Orthogonal Frequency Division Multiplexing Access (OFDMA) system, a Code Division Multiple Access (CDMA) system, or a Worldwide Interoperability for Microwave Access (WiMAX) system.

19. A base station (BS) comprising:
an input configured to
receive signals from mobile stations (MSs), wherein one of the signals having a direct channel gain (direct channel) is transmitted by one of the MSs associated with the BS,
wherein others of the signals having interference channel gains (interference channels) are transmitted by others of the MSs associated with neighboring (N−1) BSs,
wherein the BS and the (N−1) BSs provide N BSs, and wherein each of the N BSs is configured to use at least N pilot values to communicate with the MSs,
where N is an integer greater than 1; and
a channel estimation module configured to
generate channel estimates of the direct channel and the interference channels based on the N pilot values when the one of the MSs is associated with the BS, and
generate (i) a first matrix based on the signals, (ii) a second matrix based on the N pilot values, and a (iii) third matrix,
wherein the third matrix is a complex conjugate of the second matrix.

20. The BS of claim 19, wherein the N pilot values are generated by the N BSs based on sequences having a non-zero cross-correlation.

21. The BS of claim 19, wherein the channel estimation module is configured to generate:
a fourth matrix, wherein the fourth matrix is a pseudo-inverse of the second matrix; and
a fifth matrix, wherein the fifth matrix is a product of (i) the first matrix and (ii) the fourth matrix,
wherein the fifth matrix includes the channel estimates.

22. The BS of claim 19, wherein the channel estimation module is configured to generate:
a fourth matrix that is a product of a noise variance and an identity matrix that is of the same order as the second matrix;
a fifth matrix, wherein the fifth matrix is a product of (i) the second matrix and (ii) the third matrix;
a sixth matrix, wherein the sixth matrix is a sum of (i) the fourth matrix and (ii) the fifth matrix;
a seventh matrix, wherein the seventh matrix is a product of (i) the first matrix and (ii) the third matrix; and
an eighth matrix by dividing the seventh matrix by the sixth matrix,
wherein the eighth matrix includes the channel estimates.

23. The BS of claim 19, further comprising:
an interference suppression module is configured to suppress inter-cell co-channel interference (interference) based on the channel estimates,
wherein the interference is generated when the others of the signals interfere with the one of the signals.

24. The BS of claim 19, further comprising:
antennas configured to receive the signals via at least one of the antennas,
wherein the antennas are arranged in a multiple-input multiple-output (MIMO) configuration.

25. The BS of claim 19, wherein:
the MSs and the N BSs communicate via a cellular communication system, and
the cellular communication system includes an Orthogonal Frequency Division Multiplexing Access (OFDMA) system, a Code Division Multiple Access (CDMA) system, or a Worldwide Interoperability for Microwave Access (WiMAX) system.

26. A method comprising:
receiving a signal having a direct channel gain (direct channel) from a mobile station (MS) via an input of a base station (BS), wherein the MS is associated with the BS;
receiving signals having interference channel gains (interference channels) from MSs other than the MS via the input, wherein the MSs are associated with (N−1) BSs other than the BS, and wherein the BS and the (N−1) BSs provide N BSs, and wherein each of the N BSs uses at least N pilot values to communicate with the MS and the MSs, where N is an integer greater than 1;
generating channel estimates of the direct channel and the interference channels based on the N pilot values when the MS is associated with the BS;
generating a first matrix based on the signal received from the MS and based on the signals received from the MSs;
generating a second matrix based on the N pilot values; and
generating a third matrix,
wherein the third matrix is a complex conjugate of the second matrix.

27. The method of claim 26, further comprising generating the N pilot values based on sequences having a non-zero cross-correlation.

28. The method of claim 26, further comprising generating:
a fourth matrix, wherein the fourth matrix is a pseudo-inverse of the second matrix; and
a fifth matrix, wherein the fifth matrix is a product of (i) the first matrix and (ii) the fourth matrix,
wherein the fifth matrix includes the channel estimates.

29. The method of claim 26, further comprising generating:
a fourth matrix, wherein the fourth matrix is a product of (i) a noise variance and (ii) an identity matrix, wherein the identity matrix is of the same order as the second matrix;
a fifth matrix, wherein the fifth matrix is a product of (i) the second matrix and (ii) the third matrix;
a sixth matrix, wherein the sixth matrix is a sum of (i) the fourth matrix and (ii) the fifth matrix;
a seventh matrix, wherein the seventh matrix is a product of (i) the first matrix and (ii) the third matrix; and
an eighth matrix by dividing the seventh matrix by the sixth matrix,
wherein the eighth matrix includes the channel estimates.

30. The method of claim 26, further comprising:
suppressing inter-cell co-channel interference (interference) based on the channel estimates,
wherein the interference is generated when the signals received from the MSs interfere with the signal received from the MS.

31. The method of claim 26, further comprising:
arranging antennas in a multiple-input multiple-output (MIMO) configuration; and
receiving the signal from the MS and the signals from the MSs via at least one of the antennas.

32. The method of claim 26, further comprising:
communicating with the MS, the MSs, and the N BSs via a cellular communication system,
wherein the cellular communication system includes an Orthogonal Frequency Division Multiplexing Access (OFDMA) system, a Code Division Multiple Access (CDMA) system, or a Worldwide Interoperability for Microwave Access (WiMAX) system.

* * * * *